United States Patent [19]

Derighetti et al.

[11] Patent Number: 5,444,204
[45] Date of Patent: Aug. 22, 1995

[54] METHOD OF AND APPARATUS FOR ELECTRO-EROSIVE MACHINING

[75] Inventors: René Derighetti, Losone; Nikolaus Lauber, Verscio, both of Switzerland

[73] Assignee: Agie A.G. Fur Industrielle Elektronik, Losone, Switzerland

[21] Appl. No.: 883,021

[22] Filed: May 14, 1992

[30] Foreign Application Priority Data

May 15, 1991 [DE] Germany ............ 41 15 896.2

[51] Int. Cl.⁶ .................................. B23H 7/26
[52] U.S. Cl. ................... 219/69.11; 219/69.15; 219/69.17
[58] Field of Search ........... 219/69.11, 69.15, 69.2, 219/69.17; 408/31, 42, 47, 53; 204/224 M

[56] References Cited

U.S. PATENT DOCUMENTS

| | | | |
|---|---|---|---|
| 4,441,004 | 4/1984 | Inoue | 219/69.15 |
| 4,639,568 | 1/1987 | Check et al. | 219/69.15 |
| 4,670,635 | 6/1987 | Johnson et al. | 219/69.15 |
| 5,041,709 | 8/1991 | Schneider et al. | 219/69.15 |
| 5,075,530 | 12/1991 | Lee | 219/69.11 |

FOREIGN PATENT DOCUMENTS

| | | | |
|---|---|---|---|
| 2069863 | 9/1971 | France . | |
| 8615790 | 9/1986 | Germany . | |
| 57-184633 | 11/1982 | Japan . | |
| 58-51018 | 3/1983 | Japan | 219/69.15 |
| 61-153288 | 7/1986 | Japan . | |
| 62-84929 | 4/1987 | Japan | 219/69.11 |
| 62-277207 | 12/1987 | Japan | 405/53 |
| 63-84825 | 4/1988 | Japan | 219/69.15 |
| 3-251321 | 11/1991 | Japan | 219/69.16 |
| 968362 | 9/1964 | United Kingdom | 408/42 |
| 21063380 | 2/1986 | United Kingdom . | |
| 1662781 | 7/1991 | U.S.S.R. | 219/69.15 |

OTHER PUBLICATIONS

Electroerosive Mettallbearbeitung, M. Fevrer, Vogel–Buchverlag, wurzburg, Dec. 1983, pp. 25–28.

Primary Examiner—Geoffrey S. Evans
Attorney, Agent, or Firm—Cohen, Pontani, Lieberman, Pavane

[57] ABSTRACT

An electro-erosion apparatus for the machining of workpieces with a work ruble for the resting thereon of a workpiece, a first machining head, at last two degree of from of the movement of the apparatus in and/or parallel to the principal working place of the workpiece (X/Y-plane) as well as at least one additional degree of from of the movement perpendicular to the principle working place (Z-axis), which has at least one additional machining head which is fastened on the first machining head (FIG. 4 ).

18 Claims, 4 Drawing Sheets

METHOD OF AND APPARATUS FOR ELECTRO-EROSIVE MACHINING

BACKGROUND OF THE INVENTION

The present invention refers to an apparatus, particularly an electro-erosion apparatus for machining workpieces, having a machine table for receiving a workpiece, a first machining head, at least two degrees of freedom of movement of the apparatus in and/or parallel to the main working plane of the workpiece (X/Y-plane) and at least one additional degree of freedom of the movement perpendicular to the main working plane (Z-axis). The invention also refers to a method of machining workpieces, particularly an electro-erosive method, in which a workpiece on a machine table is machined with a first machining head in at least two directions of movement in and/or parallel to the main working plane of the workpiece (X/Y-plane) and at least one additional direction (Z-axis) perpendicular to the main machining plane.

Such apparatus and methods of machining are known, for instance, from milling machines or electro-erosion sinker machines.

In the following a terminology is used which serves for the easier reading of the specification but is not to be understood in a limitative manner. For example, the expressions top/bottom, larger/smaller, etc., refer to machines of ordinary operational setup and size.

In apparatus of the aforementioned type, the path of displacement of the machine in the X/Y-plane of the workpiece is determined by the paths of travel of a machine table and/or of an upper carriage.

In electro-erosion sinker machines, particularly medium sized and large machines, there is a functional relationship between desired electrode weights and weights used in practice and the displacement paths of the machine.

In general, in the case of electrodes of high weights, very small travel paths are required (in the case of planetary movements and upon scanning of references upon the adjustment of workpieces) while with small electrode weights a path of travel over the entire size of the table is desired (in the case of local machining with small electrodes).

This results from the different possibilities of use of such electrodes. Small electrodes, for instance electrodes in pin-shape or other simple geometric shapes, can be used among other things for the manufacture of complex shapes and for erosion machining in several directions of movement. In this connection, for instance, a plurality of different small electrodes are preferably employed with which individual sections of the workpiece are machined. The weight of such electrodes tends to be slight. The use of this operating technique is possible by modem CNC control techniques which make it possible in very simple fashion to effect a precise positioning of the electrodes. Another advantage of the use of small electrodes resides in their simpler manufacture and, of course, in the uncomplicated replacement of individual electrodes which are particularly worn.

The smaller paths of travel of large electrodes are explained in similar manner. Frequently, a large electrode having a complicated pattern is simply lowered, without further machining in the X/Y-plane, in Z-direction into the workpiece. Here, on basis of slight displacements of the electrode still before the start of the sinker, a coordinate zero point must be determined by the scanning of reference points.

Summarizing, it can thus be stated that there is a particular need for machines with a large path of travel for small electrode weights.

Machines with a moveable portal have relatively large paths of travel in one direction of the plane of the workpiece (X longitudinal direction) but not in the other (Y transverse direction). Larger paths of displacement are obtained with a portal construction having two discharge heads which are independent of each other. In this case, a second head of reduced supporting force is fastened by an additional shaft on the transverse beam of the bridge. This solution, however, is relatively expensive. In machines of C-type construction, customary variants are for instance, machines having a displaceable compound table and ones with upper displaceable carriages - the essential advantage as compared with the portal construction resides in the lower cost. An increase in the displacement paths has up to now always meant a substantial increase in the machine expenses since the dimensioning is determined by the maximum electrode weight or workpiece weight.

SUMMARY OF THE INVENTION

The object of the invention is to increase the displacement paths in the plane of the workpiece in a simple manner. Another object of the invention is to provide a method which permits the simple and convenient handling of an apparatus in accordance with the invention.

The Invention

This object is obtained in the apparatus of this type in the manner that it has at least one additional machining head which is fastened on the first machining head. In the method of this type, the object is attained by machining with at least one additional machining head which is fastened on the first machining head.

The machining surface of the apparatus is therefore no longer limited by the path of displacement of the first machining head but is increased by the distance between the principal axis of the first machining head and the principal axis of the second machining head. In this connection the existing firmware for the control of the apparatus need be only minimally expanded or changed.

By a moveable mounting of the second machining head on the first machining head, the possibilities of machining workpieces are considerably increased since the reach is increased not only in one direction but in the entire region of movability. An optimal increase in the machining surface is obtained with a machining head which is swingable around the second machining head.

The second machining head preferably has at least one degree of freedom of movement of its own, in particular its own degree of freedom of rotation (C-axis). The advantage of these features resides in the increased possibilities of using different techniques of erosion (for instance, circular or planetary erosion) and in the possibility of directing the second machining head in accordance with the angle of swing set.

The second machining head is preferably arranged on a sleeve of the first machining head. In this way, the vertical displaceability of the second machining head is obtained from the Z-displacement of the sleeve of the first machining head.

Separate vertical adjustability of the second machining head in Z-direction makes it possible to leave the electrode of the first machining head mounted in the clamping device during machining by the second machining head and achieve a greater vertical adjustability, which otherwise is limited by the size of the electrodes used or by the lower edge of the clamping device of the first machining head. In this case, the second machining head has its own sleeve.

The swinging of the second machining head around the Z-axis of the first machining head can be effected with the assistance of a drive. A manual swinging device can be provided in particularly price-favorable manner, but operation is automated and simplified by a motor drive.

A mechanical clamping device for locking the second machining head increases the rigidity of the second machining head with respect to the first machining head during the machining of a workpiece. This locking can be effected particularly easily by means of a pneumatic clamping device.

It is particularly preferred if suitable firmware (hardware and software) suitable for the automatic control of the second machining head is present so that the operation is uncomplicated. By a development of the control which makes it possible to enter a position of the workpiece to be machined directly in coordinate form and which, depending on the places of the workpiece to be machined, automatically switches, without action by the operator, between the two machining heads, the control of the apparatus is further automated and improved.

The apparatus is preferably developed in the form of an electro-erosion sinker machine since particularly in the case of electro-erosion machines, there is a need for large travel paths. In this connection, the first machining head has a sleeve with a clamping device for a sinker electrode and the second machining head has a sleeve of reduced size and also a clamping device for a sinker electrode.

The machine is developed to particular advantage in a C-frame construction, with a compound table and/or an upper carriage. The cost-favorable C-construction is further improved by the additional advantage of the large displacement path. The invention can, however, also be employed in the case of portal constructions.

A measurement sensor which permits easy and automatic measuring of a workpiece to be machined on the working surface is preferably arranged in the clamping system of the second machining head.

The machining with the second machining head permits a large number of combinations of machining techniques (large electrodes and small electrodes). It is simplified by the fact that the machining plane is divided into a central machining surface and a plurality of outer machining surfaces. One advantage of this method of machining resides in the fact that the traditional control need be only minimally expanded. Preferably, in this case a reference point is associated with each machining surface. The second machining head is moved for the machining of work coordinates outside the central machining field to the reference point of a corresponding machining field.

The control of the second machining head is preferably effected by existing firmware for the control of the first machining head, with due consideration of the displacement of the origin of the coordinates to a specific reference point. The traditional control of the machine must thus be supplemented only by another rough movement - the swinging. It is particularly preferred to supplement the method by the step of claim 18 and therefore by an automatic rotation of the C-axis of the second machining head. This effects an automatic equalization of the swinging of the second machining head around the Z-axis.

An automatic correction of the position of the swing axes X, Y, Z by prestored electronic machine correction parameters increases the precision of machining of the second machining head.

The measuring of a machining surface of a workpiece to be machined can be easily and automatically effected by a measurement sensor which is arranged in the clamping system of the second machining head.

BRIEF DESCRIPTION OF THE DRAWINGS

Other preferred features of the invention will become evident from the following description of preferred embodiments. These embodiments are shown diagrammatically in the accompanying drawing, which also shows the difference between apparatus in accordance with the invention and the aforementioned prior art.

DESCRIPTION OF THE DRAWINGS

Figure 1:
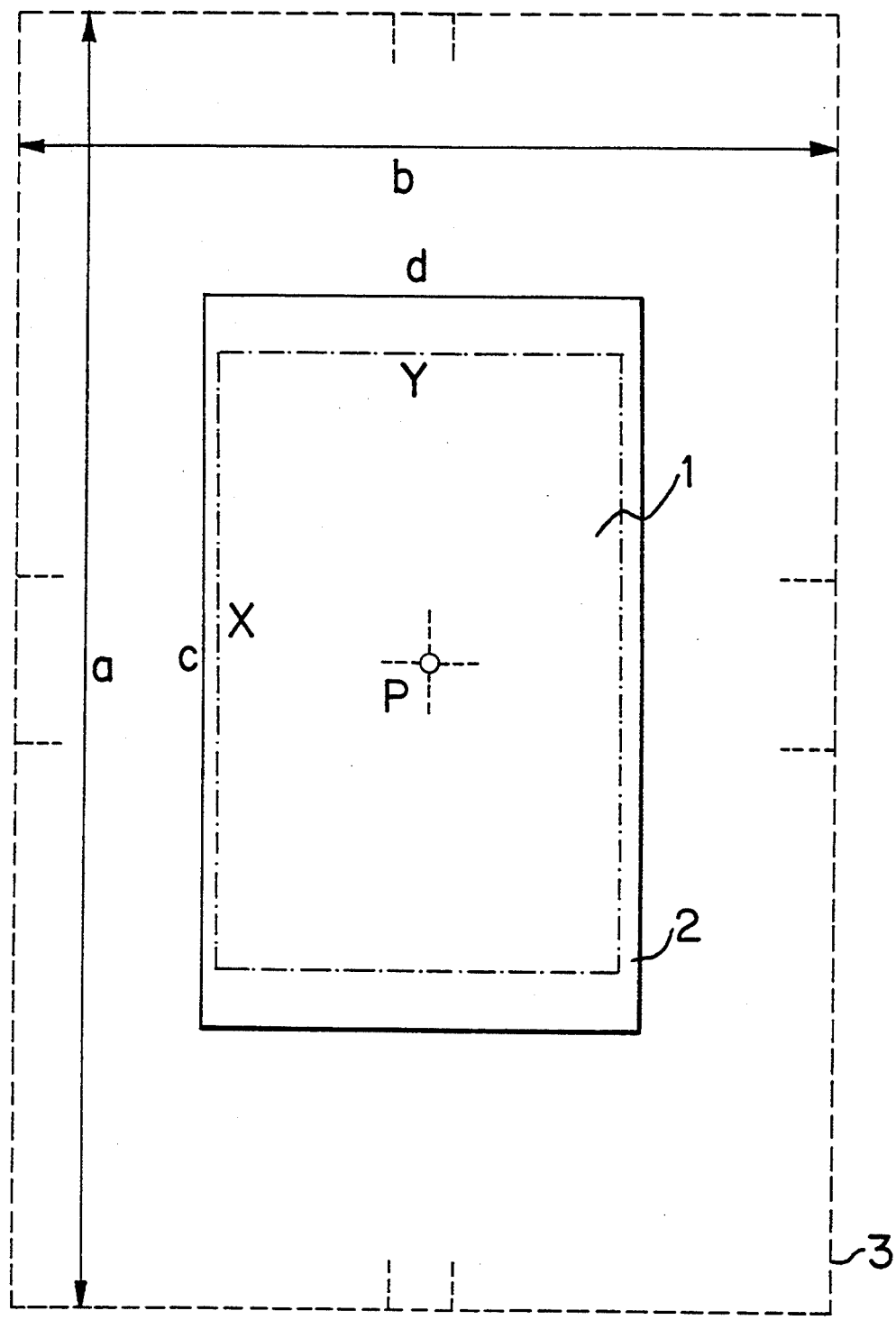
FIG. 1 is a top view of a work table of a known apparatus having a traditional "large" machining surface.
Figure 2:
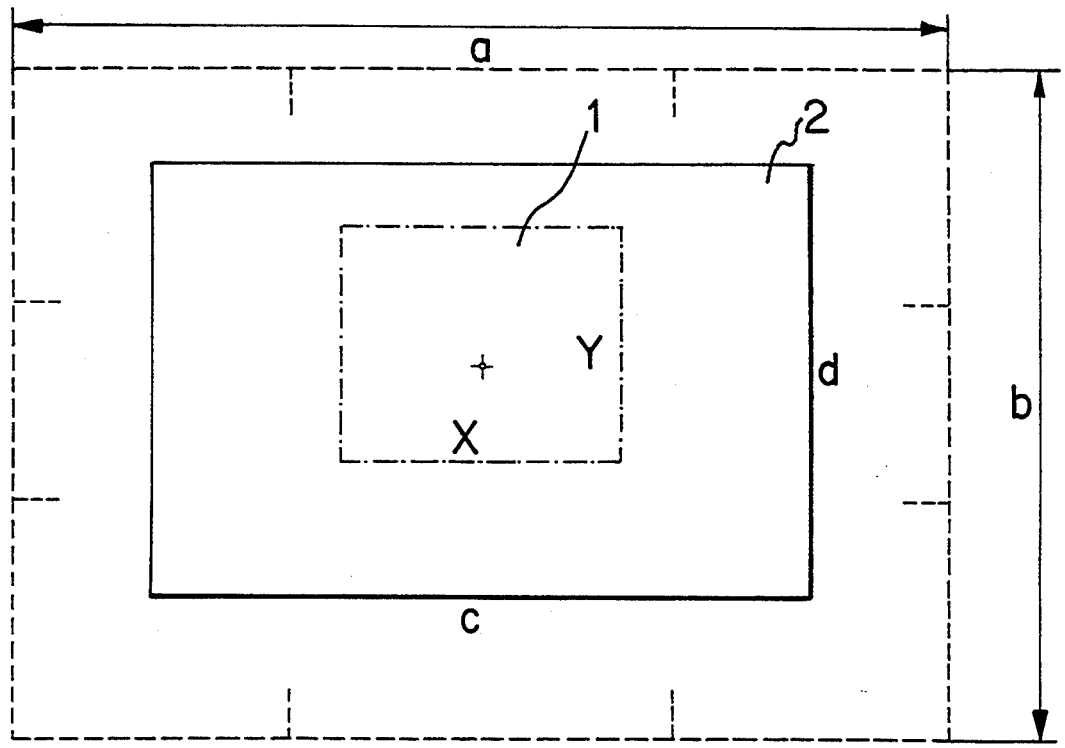
FIG. 2 is a top view of a work table of a known apparatus having a traditional "small" machining surface.
Figure 3:
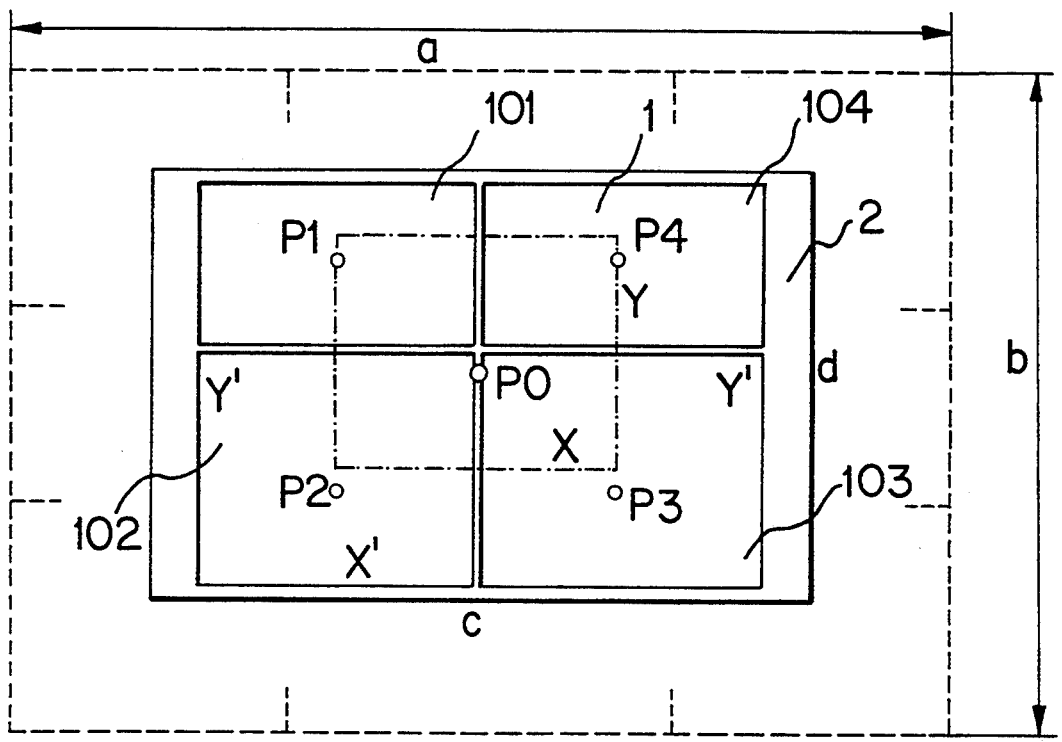
FIG. 3 is a top view of a work table of an apparatus in accordance with the invention.

FIGS. 1 to 3 show, on a reduced scale, the approximate space required by different embodiments of electro-erosion sinker machines. The embodiments of FIGS. 1 and 2 correspond to the prior art. All dimensions are to be understood merely as approximate guidelines; they come from an embodiment which is intended for the market.

FIGS. 1 to 3 show, in each case, one or more machining surfaces 1, 101, 102, 103, 104, a machine table 2 and the outside dimensions a, b of the apparatus. If, for instance, a displacement path of 1.2 m is desired in x direction and one of 0.8 m in Y direction, a traditional apparatus of C- frame construction requires an outside dimension of a x b namely, about 2.6×1.7 m (FIG. 1). The pure space required for the machine is thus about 4.5 m$^2$ and is thus too large as compared with the machining surface. The machine is thus uneconomical.

By an apparatus in accordance with the invention having the features set forth in claims 1 and 2 - the invention arose in the course of investigations on enlarging the paths of displacement of existing plants - a machining surface of 1.2×0.8 m can be obtained already with an apparatus having outside dimensions a×b of about 2×1.4 m. In FIG. 2, the X/Y machining surface 1 of a known apparatus having these outside dimensions is shown diagrammatically in top view. The machine surface 1 has a size of 0.6×0.5 m. Since the sleeve axis is not in the center of the machining table the depth of machining, seen from the axis of the sleeve, is different as a result of construction in positive and negative Y directions (for instance, Y+ =0.3 m and Y− =0.2 m). With a second machining head 12 (FIG. 4) which has a radius of swing of about 390 mm, the machining space a×b can be increased to the desired 1.2×0.8 m.

The customary construction of the machine does not permit full utilization of the axis of swing since the fields 101 and 104 are limited by the asymmetry of the movement in Y direction with respect to the container. The particular advantage however is that the space required for the container of the machine and its movement remains unchanged and that an existing machine can thus be expanded or retrofitted by simple means at low cost. In a new construction with the sleeve axis of a first machining head 7 (FIG. 4) in the center of the work container (FIG. 7) this asymmetry can also be eliminated.

Figure 4:
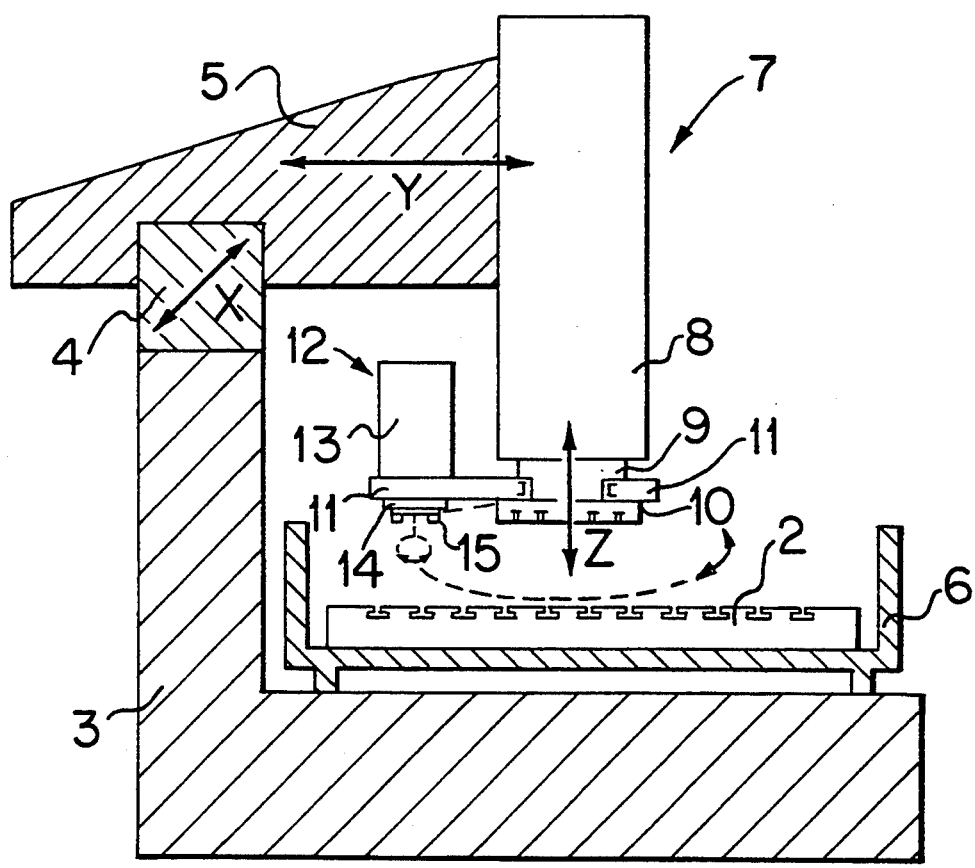
FIG. 4 is a diagrammatic cross sectional view of an embodiment of an electro-erosion sinker machine of the invention.

FIG. 4 shows the basic construction of an apparatus according to the invention shown on a preferred embodiment of an electro-erosion sinker machine. In addition to the customary components (not shown here), such as for instance numerical control, generator and dielectric preparation, the machine consists of a C frame 3, an upper X carriage 4, an upper Y carriage 5, a dielectric container 6 and a machine table 2. The first machining head 7, which has a machining head 8, a sleeve 9 and an electrode holder 10, is fastened on the Y carriage 5.

The first machining head 7 is displaceable preferably in Z-direction and therefore perpendicular to the principal machining plane X/Y. By means of a mount 11 which is arranged on the sleeve 9 of the first machining head 7, the second machining head 12 is movably supported on the first machining head 7. The second machining head 12 is displaceable around the first machining head 7 and the Z-axis or sleeve axis of the first machining head 7 is thus referred to below also as the axis of swing.

The second machining head 12 has the head part 13, a C-axis 14, and a clamping device 15 for a sinker electrode which is preferably provided with a measurement sensor for measuring a workpiece to be machined. The second machining head 12 can also be fastened rigidly by the mount 11 to the first machining head 7 or - and this is particularly preferred - it can be swingable by a given angle or all around the first machining head 7. By a degree of freedom of motion of its own - a rotation around the C-axis - the orientation of the electrode can be maintained constant in any desired position of the axis of swing.

By vertical displaceability of the electrode of the second machining head 12, i.e. by a sleeve (not shown) of its own, the possibilities of use of the second machining head 12 are further expanded. The particular advantage of such a development resides in the fact that the second sinker electrode can be lowered deeper into the workpiece than would be possible with an electrode without this degree of freedom of its own.

The work space of the sinker machine is thus enlarged both in X direction and Y direction by about twice the distance between the sleeve axis of the first machining head 7 and the sleeve axis of the second machining head 12, since the swinging can take place all around.

Embodiments are of course also possible in which the swinging of the sleeve is limited to a given angle. An embodiment is also possible which has a plurality of additional machining heads 12 (for instance, four additional heads) which may also be rigidly attached to the first machining head 7 by the mounts 11. Such a construction is somewhat more expensive, but it also enlarges the machining surface. All swinging movements are then dispensed with.

Figure 5:
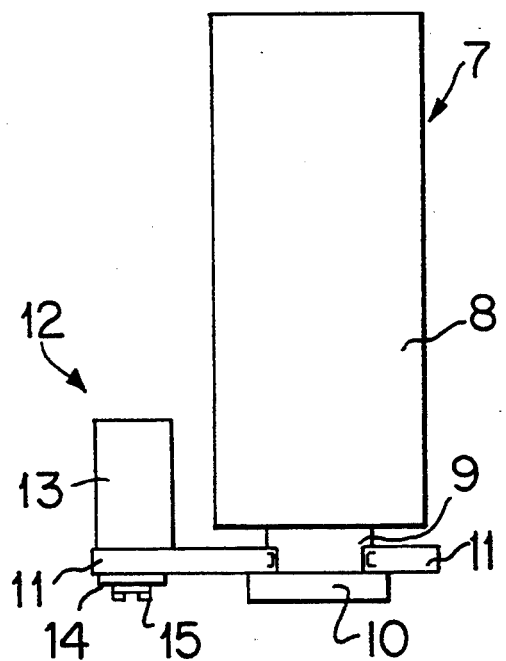
FIG. 5 is a machining head in accordance with the invention such as shown in FIG. 4.

By the above-described construction, the paths of displacement for smaller electrode weights are in particular increased. The paths of displacement and the construction of the machine for large electrodes and for large workpiece weights do not change in this connection. The construction is, in particular, adapted for subsequent enlargement of the work space of existing machines at favorable expense. This enlargement of the work space is of course also obtained if a construction (similar to FIGS. 5 and 6) consisting of a first and at least one additional machining head 7, 12, is fastened to a machine of portal construction or to a machine having a machine table displaceable in X/Y direction. Furthermore, for instance, the work space of a milling machine of such a construction can be enlarged. Existing firmware for controlling the machine can be used and requires only slight additions.

Figure 6:
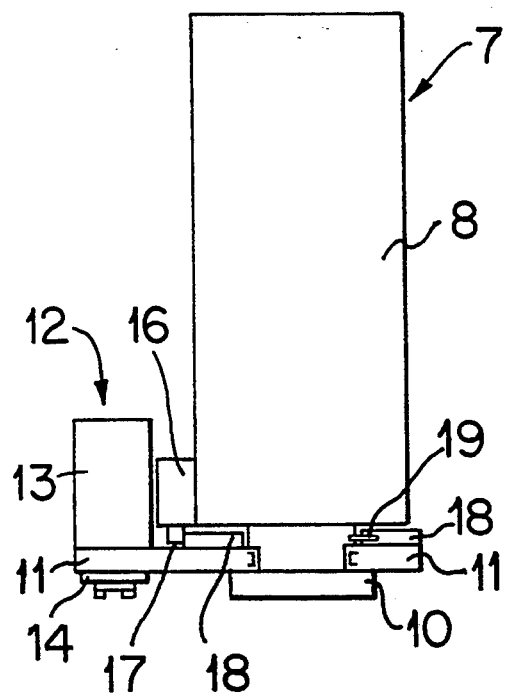
FIG. 6 is another embodiment of a machining head in accordance with the invention.

FIG. 6 shows the construction of the two work heads 7, 12, expanded by a drive 16. In this way, automatic swinging of the second machining head 12 around the first machining head 7 is possible. In FIG. 6, a drive 16 (for instance a stepping motor), a transmission 17 and a drive receiver 18 are shown purely diagrammatically. The drive receiver 18 can be locked by a positioning clamping 19. The second machining head 12 can thus be held at a constant angle to the first machining head 7.

The use of two machining heads 7, 12, is preferably effected in the manner described below.

Figure 7:
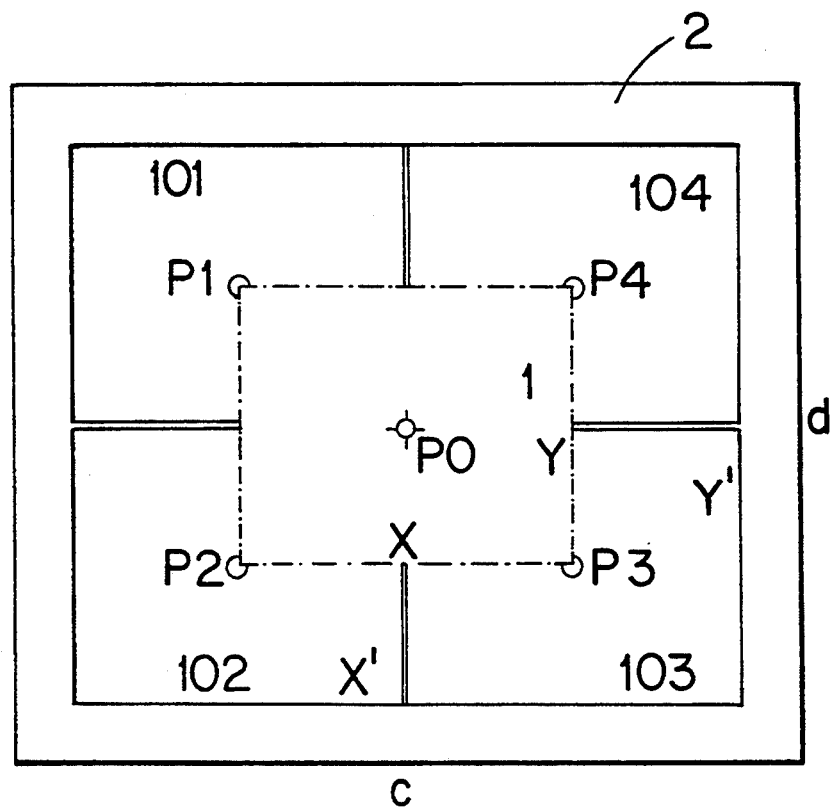
FIG. 7 is a top view of a diagrammatically shown work table of an apparatus in accordance with the invention having an enlarged machining surface.

As shown in FIG. 7, the X/Y-machining surface is divided into a central machining field 1 and several outer machining areas 101, 102, 103, 104. Four or six outer machining areas are preferably employed. A reference point is associated with each machining area. The first machining head 7 can, as mentioned, be used for the working region 1. The second machining head 12 is preferably used in the event of the occurrence of coordinates outside the area 1. For this purpose, it is swung to a corresponding reference point P1, P2, P3, P4. There, it can be locked by the positioning clamping 17. The electrode of the second machining head is aligned by a rotation around the C-axis and the coordinate origin of the control is placed at the controlled reference point. A limited number (4 to 6) of predetermined positions already permit more than 95% of the surface of the table to be reached. The working surface 101–104 is four times larger than the original machining field 1 having the outside dimensions x and y.

By the use of modern CNC, the introduction of an additional rough movement, the storage of reference points, and their automatic switching is possible without disadvantages for the operator.

Another advantage of the invention resides in the possibilities of simplifying the electrode magazine and changer. The electrode holders need not be further moveable, which constitutes a further simplification and decrease in cost of the machine. By the swingability of the second machining head it is possible to shift the change electrodes to any desired place within the container.

We claim:

1. An apparatus for electro-erosive machining of a workpiece, comprising a machine table for the placing thereon of a workpiece;

a first main machining head having a perpendicular axis, the apparatus having at least two degrees of freedom of movement in and/or parallel to a principal working plane of the workpiece, and at least one additional degree of freedom of movement perpendicular to the principal working plane; and at least one additional machining head which is fastened to the first machining head so as to be movably supported on the first machining head and swingable around the perpendicular axis of the first machining head; and wherein the at least one additional machining head is independently vertically displaceable.

2. The apparatus of claim 1, wherein the at least one additional machining head has at least one degree of freedom of movement of its own.

3. The apparatus of claim 1, wherein the at least one additional machining head has a degree of freedom of rotation of its own.

4. The apparatus of claim 1, wherein the at least one additional machining head is arranged on a sleeve of the first machining head.

5. The apparatus of claim 1, and further comprising drive means for swinging the at least one additional machining head.

6. The apparatus of claim 1, and further comprising a mechanical or pneumatic positioning clamp for locking the at least one additional machining head.

7. The apparatus of claim 1, wherein means are provided for automatically controlling the second machining head.

8. The apparatus of claim 7, wherein the controlling means is constructed so as to permit a position of the workpiece to be machined to be input directly in coordinate form.

9. The apparatus of claim 7, wherein the controlling means, depending on the places of the workpiece to be machined, automatically switches between the machining heads.

10. The apparatus of claim 1, having means for an electro-erosion sinker machine, wherein the first machining head has a sleeve with a clamping device for a counterbore electrode, and, the at least one additional machining head has a sleeve with a clamping device for a counterbore electrode.

11. The apparatus of claim 10, having a C-frame construction with at least one of a compound table and an upper carriage.

12. The apparatus of claim 10, having a measurement sensor in the clamping system of the at least one additional machining head for automatic measurement of the position of the workpiece on a machining surface.

13. A method of machining workpieces by electro-erosion, comprising the steps of:

machining a workpiece on a machining surface of a machine table with a first machining head at least in two directions of movement in and/or parallel to a principal working plane of the workpiece and in at least one other direction perpendicular to the principal working plane, and, further machining with at least one additional machining head which is configured revolves about an axis extending through the first machining head.

14. The method of claim 13, comprising a further step of dividing the machining surface into a central machining surface and several outer machining surfaces.

15. The method of claim 13, including assigning a reference point to each machining surface, moving the at least one additional machining head upon an occurrence of work coordinates outside the central machining surface to a reference point of a corresponding machining surface, and effecting control of the at least one additional machining head by using control means of the first machining head, with consideration of the displacement of the coordinate origin to the corresponding reference point.

16. The method of claim 13 including automatically importance rotary movement to a C-axis of the at least one additional machining head in order to equalize swinging around the C-axis.

17. The method of claim 13 having an automatic correction of the swing-axis position X, Y, Z by pre-stored electronic machine correction parameters.

18. The method of claim 13, including using a measurement sensor in the clamping system of the at least one additional machining head for automatically measuring of the workpiece on the machining surface.

* * * * *